United States Patent [19]
Ahlen

[11] 3,831,463
[45] Aug. 27, 1974

[54] HYDROMECHANICAL TRANSMISSIONS INCLUDING TORQUE CONVERTER HAVING RELEASABLE PUMP OR TURBINE COMBINED WITH HOLDING CLUTCH GEARS

[75] Inventor: Karl Gustav Ahlen, Stockholm, Sweden

[73] Assignee: S.R.M. Hydromekanik Aktiebolag, Vallingby, Sweden

[22] Filed: Feb. 1, 1973

[21] Appl. No.: 328,525

[30] Foreign Application Priority Data
Feb. 7, 1972    Great Britain...................... 5487/72

[52] U.S. Cl. ............................................... 74/732
[51] Int. Cl. ............................................. F16h 47/00
[58] Field of Search ...................................... 14/732

[56] References Cited
UNITED STATES PATENTS
2,966,978    1/1961    Kaptur .............................. 74/732 X
3,085,449    4/1963    De Corte et al. ................. 74/732 X
3,554,057    1/1971    Michnay et al. ........................ 74/732
3,564,938    2/1971    Hause .............................. 74/732 X

*Primary Examiner*—Leonard H. Gerin
*Attorney, Agent, or Firm*—Larson, Taylor and Hinds

[57] ABSTRACT

This invention relates to a vehicle transmission, including a torque converter, which is capable of producing gentle shifts between different gear ratios. This is attained by releasing one of the bladed components in the torque converter during a gear shift.

In more detail, a torque converter is of the rotating casing type and the transmission includes a two speed gear having a holding clutch which may take either of two positions, viz. high and low, and the releasable bladed component is automatically released from the rotating casing when a holding clutch is changed from one position to another. The releasable bladed component may be the pump component or the turbine component of the torque converter.

31 Claims, 7 Drawing Figures

PATENTED AUG 27 1974                3,831,463

HYDROMECHANICAL TRANSMISSIONS INCLUDING TORQUE CONVERTER HAVING RELEASABLE PUMP OR TURBINE COMBINED WITH HOLDING CLUTCH GEARS

The present invention relates to vehicle transmissions which include combinations of hydrodynamic torque converters and multiple speed gears or power shift gears.

Hitherto torque converters coupled for operation with synchromesh gears have always necessitated the use of friction clutches capable of connecting under driving torque. In addition, torque converters followed by power shift gears of different types are not uncommon. In the first mentioned type of transmission the necessity of a release clutch of the same type as normally used between the engine and the synchromesh gear box has disadvantages, such as a heavy and expensive unit and also because the friction coupling has to be capable of synchronization under a torque which is considerably higher than the stall torque of the torque converter; the highly desirable gentle shifts are not produced in spite of the presence of the torque converter. Moreover, in practice, the peak torque reached during the connection badly affects the gears if they are not specially designed for the purpose required.

The use of a transmission including a combination of a torque converter and full power shift gears has, up to now, always resulted in high fuel consumption due to the fact that these gears necessitate the use of general multiple disc clutches or brakes, of which only one at a time is connected whereas the primary and secondary parts of the remaining clutches are rotating relatively to each other with high differential speeds and also due to the high number of gear parts rotating relatively to each other even in high gears. Further, because the clutches must be designed for transmitting maximum torque and the fact that the masses to be synchronised are so great that they do not allow the synchronizing torque to be absorbed by spring actions of the connecting parts in the neighborhood, there have been substantial difficulties in designing them to give gentle shifts and especially maintaining the gentle shifts for the normal working life of the transmission.

It is an object of the present invention to provide such vehicle transmission structures that are capable of producing gentle shifts between different gear ratios without creating undue wear of the friction surfaces, simultaneously as reducing surfaces rotating in relation to each other, creating losses to a minimum, and also as reducing the weight of the rotating masses and simplifying the design to obtain lower production costs and omitting peak torques, which in its turn means possibilities of reducing the size of the transmission in relation to that of another type of transmission for the same purpose.

The object of the invention is fulfilled by the utilization of the release of torque transportation by always releasing one of the bladed components in the torque converter during a shift of connected gear trains and by the utilization of the special features of the release method by always having the bladed component released during a shift. In some cases, this allows direct connection of a synchromesh gear box to the turbine output shaft. In other cases, instead of the utilization of full power shift clutches or brakes, it permits use of so called holding clutches or brakes, which make synchronization operable under low phase pressures in the early part of the time during increasing pressures, which has become possible partly due to the fact that synchronization is not effected during torque transportation because the drive line is broken at another point, namely in the torque converter, and because the masses of the rotating parts, the speed of which has to be adjusted, are relatively small thereby enabling relatively rapid synchronization before the specific pressure on the friction surfaces has reached $10 - 40$ Kg/cm$^2$, that is, the normal values for full power shift clutches. Thereafter, the specific pressure is increased up to values several times normal pressures about $100 - 200$ Kg/cm$^2$ to hold without slipping during torque transportation which means that only very small couplings or brakes have to be used and such couplings or brakes only produce low ventilation losses when freely rotating.

The invention will now be further described by way of example with reference to the accompanying drawings, of which.

Figure 1:
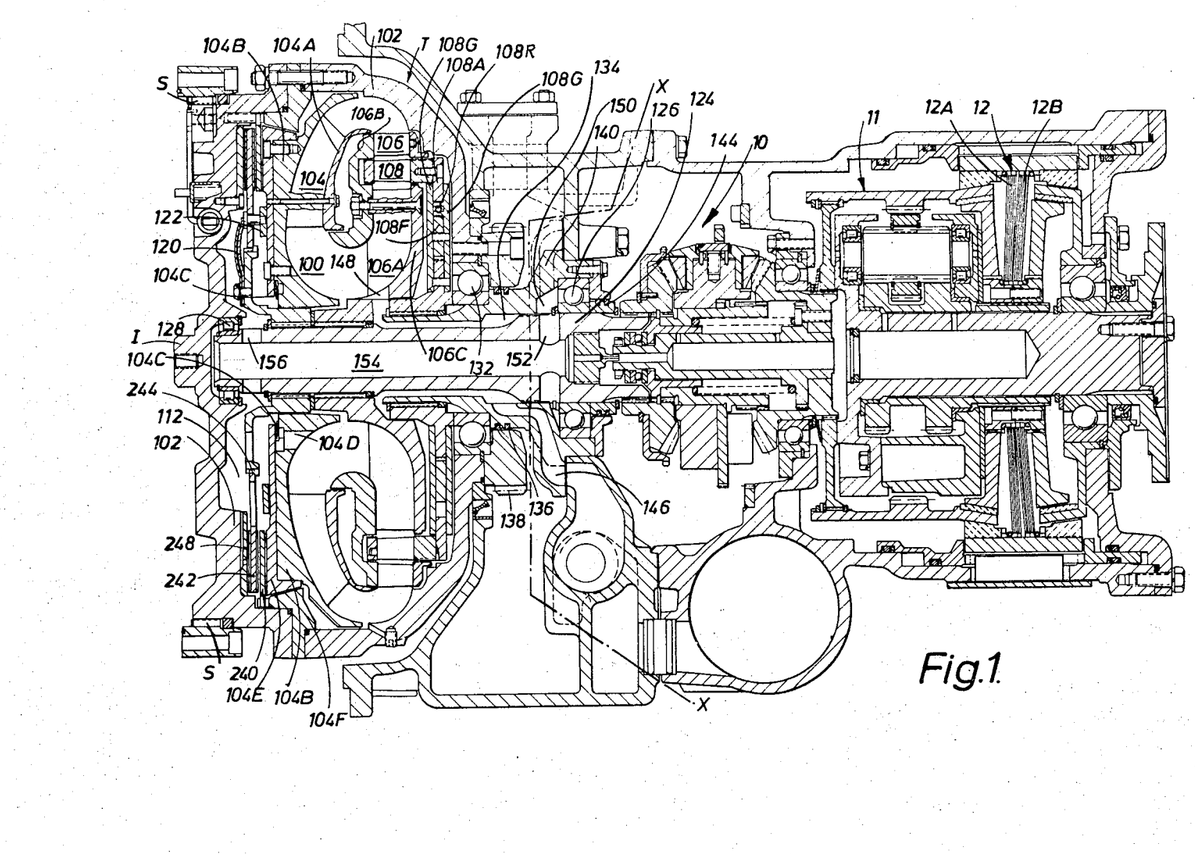
FIG. 1 shows a torque converter with a releasable pump part combined with a reverse gear having spring load connection of forward drive and two-speed gear having spring load holding clutches for connection of high or low.

In more detail the torque converter T has a rotatable casing 102 defining a working chamber 100 in which thre is mounted a bladed pump component 104, first and second rows of bladed turbine components 106/106A and a bladed guide vane component 108. The guide blades are carried by a disc 108A and the pump component has an inner ring 104A and an outer ring 104B. The two rows of blades of the turbine component have a common inner ring 106B and are together carried by a hub 106C. The hub 106C of the turbine is mounted on shaft 124 journalled in the rear end by bearing 126 and in the front end by a bearing 128 in the rotatable casing which, in turn, has its front end mounted on the driving source (not shown) and its rear end supported by a bearing 132. The rotatable casing 102 has an abutment 134 and a gear 138. The rotating casing bearing 132 and the guide vane disc 108A are mounted on a stationary abutment 140 which is sealed against the rotating casing 102 by ring seals 136 and by ring seals 144 against the turbine shaft 124. The stationary abutment 140 and the turbine hub 106C are provided with a path formed by channels 146 and 148 forming inlets and outlets alternately for the working chamber 100 and another path formed by channels 150, 152, 154, 156 forming outlets and inlets respectively for the working chamber. The rotating casing 102 is driven from the flywheel of the driving source by a spline connection S.

The releasable pump arrangement is shown in detail in my copending application Ser. No. 262,514, filed June 14, 1972. It will be seen from FIG. 1 that the bladed pump component 104 is an entirely separate element and that it includes a one way maximum pressure valve 104C which, in fact, acts as a minimum pressure difference control device located in channel 104D. The pump component 104 is formed as a servo-motor piston having three operative positions. In one position the piston has the same oil pressure on both sides or a slightly higher pressure in the working chamber 100, than in chamber 112 between the pump component part 104B and the rotatable casing 102. In this position pre-stressed spring elements 120 maintain a friction disc device 122 in a pre-determined central position. In this position the same fluid pressure is generally present in channels 146/148 and the channels 150, 152, 154, 156. In a second position of the servo-motor piston fluid enters through the channels 150, 152, 154, 156 and passes through the two-way maximum pressure valve 104C and enters the working chamber 100 thereby providing a pressure difference between the space chamber 112 and the working chamber 100, due to which the pump element 104 will force a cone clutch element 104E into engagement with the cone clutch element 104F of the rotating casing, thereby bringing the pump element 104 into engagement with the rotating casing 102 so as to establish a hydraulic drive. The cone clutch may be connected and disconnected by slight movements even when the rotating casing 102 is rotating at full speed, whereby torque may be obtained from the turbine shaft, but the connection cannot be modulated unless the cone clutch is substituted by a multiple disc clutch device which may easily be done.

In a third position of the servo-motor piston fluid enters through the channels 146 and 148, and the fluid has to pass through the two-way maximum pressure valve 104C before it vents through the channels 156, 154, 152, 150 thus establishing a pressure difference between the working chamber 100 and the space 112 whereby the pump part 104 forces a disc 240 mounted on the rotating casing 102 against a friction plate 242 mounted on the turbine shaft 124 by means of a spline connection 244, and the plate 242 is forced against a friction plate 248 connected to the rotating casing 102 so that a connection is obtained between the rotating casing 102 and the turbine shaft 124, which means that the torque converter is locked for direct drive. To allow this locking of the torque converter, the disc of the guide vane component is formed with a free-wheel connection enabling the guide vane blades to rotate freely in the same direction as the rotating casing 102 but not in the opposite direction. This free-wheel connection comprises the disc 108A connected to the stationary abutment 134, a free-wheel ring 108F, axial guide rings 108G and rollers 108R, the rollers in the normal manner of a free-wheel form a connection between surfaces with decreasing interspace in the direction in which the ring is to be held.

In FIG. 1, output from the torque converter T is via a dog clutch reverse gear 10 of the planetary gear type as described in my copending U.S. Appln. Ser. No. 141,633, filed May 10, 1971, which gear is in turn connected to a two-speed gear 11 which provides high variations of gear ratios and a holding clutch 12 connected to the two speed gear 11. The holding clutch 12 is what may be regarded as an over-centred spring arrangement employing two sets of so-called Bellville springs 12A/12B which may assume either of two positions. In the first position the two speed gear effects direct drive and in the second position the two speed gear is connected for low gear ratio. At shift from direct drive to the low gear ratio or at shift of the dog clutch 10 from forward to reverse gear, the pump component 104 of the torque converter is released to rotate freely. During shift of the dog clutch 10, the vehicle must be stationary, but actual shift of the holding clutch 12 for effecting shift of the two speed gear 11 may be made under any driving condition because it is only required to synchronize the turbine, through the gear, with the output shaft. The precise manner by which the two speed gear 11 functions to transmit the said direct and low ratios drives will be apparent to one skilled in the art and will not be described in further detail.

The combination of gears and the torque converter shown in FIG. 1 depend for their function on the fact that an arrangement of the releasable pump is chosen which produces a sufficiently effective release (that is, the possibility of driving the primary side up to full speed with the turbine standing still when the pump is released without getting too high drag torque) and, on the other hand, allowing the engine or the primary part to stand still, when driving the vehicle up to maximum speed, which means driving the turbine up to maximum speed. This can be achieved by using a torque converter arrangement according to my co-pending British Pat. Application No. 50904/72, filed Nov. 3, 1972 and U.S. Pat. Application Ser. No. 348,191, filed Apr. 6, 1973, and a released position can be omitted both for the reverse gear and for the cooperating matching gear. The spring operated clutch 12 shown in FIG. 1 operates in such a way that two of the spring plates, say 12 A, create the required axial force in one direction and the two other spring plates 12B create the required axial force in the other direction according to which direction the cone formed by the spring plates is set at any particular moment and in which the plates creating the axial force then produce their minimum axial force.

As to the reverse gear, omission of the neutral position and the use of the spring actuated forward connection is also possible due to the combination which eliminates the often so troublesome fork in contact with a rotating plate because in this form of the present invention the pressure required to connect reverse is applied during that operation to the stationary plate. Also due to the special combination relatively small masses are to be synchronized during the shift of the multiple speed gear and holding clutches can be used. In this form of the invention, the successive building up of the torque is partly due to the fact that one pair of the conical surfaces of the Bellville springs operates to effect synchronisation before the second pair of conical surfaces of the springs come into contact which occurs simultaneously as the pressure is increased to increase the holding torque.

In the form of the invention shown in FIG. 1 the forward/reverse gear is in front of the multiple speed gear, which increases the mass on the primary side. The purpose for this arrangement is in the standardisation of components, as the multiple speed matching gear is not always necessary. For certain applications the arrangement might however be the opposite, with the reverse gear positioned after the holding clutch gear.

From the foregoing, it will be appreciated that the present invention has resulted in a transmission which in direct drive has only one rotating body thus saving the arrangement from losses which are primarily speed responsive. Since the release of the pump component allows driving of the secondary shaft (at stationary engine condition) up to maximum speed, the holding clutch does not need more than two positions, viz. connected for high gear ratio and low gear ratio.

Figure 2:
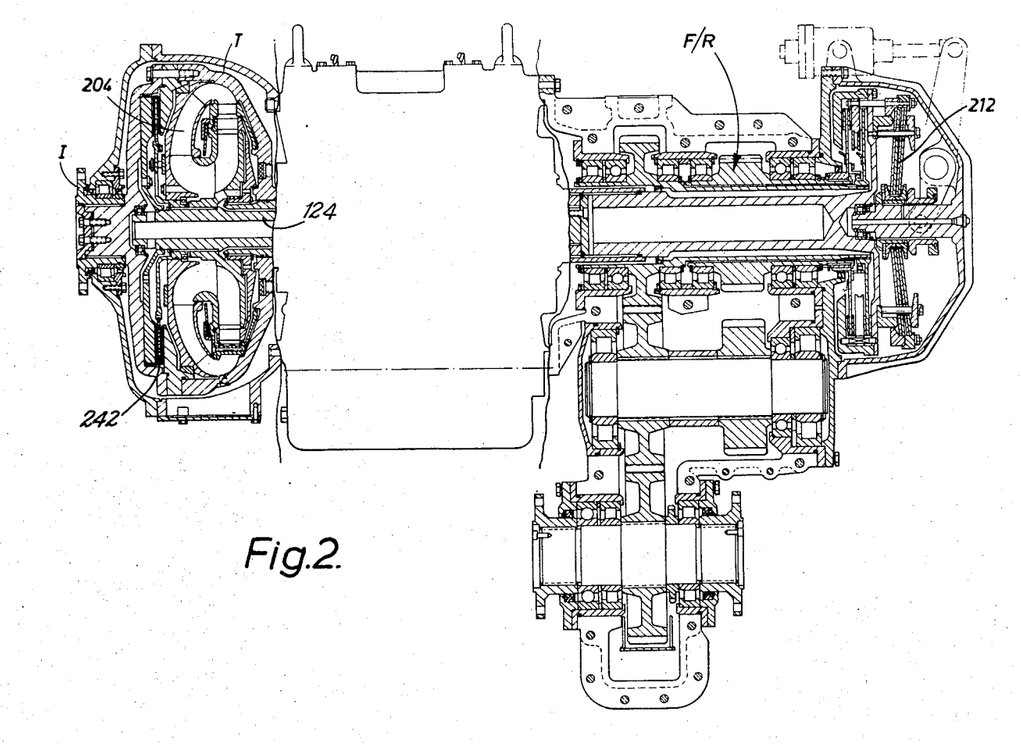
FIG. 2 shows an arrangement of a releasable pump torque converter transmission of the double rotation type in combination with a forward/reverse gear to be used especially for railway purposes, in which the change of drives in the reverse gear is made by a spring actuated holding clutch.

FIG. 2 shows an arrangement of a releasable pump torque converter transmission T of the double rotation type (full details not shown) in combination with a forward/reverse gear F/R to be used especially for railway purposes, in which the change of drives in the reverse gear is made by a spring actuated holding clutch 212. The torque converter side per se of FIG. 2 is essentially similar to the torque converter T of FIG. 1. Because connection and disconnection of pump member 204 can be made at any speed combination between the input shaft I and the turbine shaft 124 at high frequency without noticeable wear of the friction element 242 and without creating any torque more than the hydraulic torque, which should be normal for the speed combination in question, it is now possible to change from forward to reverse even when the speed of the locomotive is considerable in forward direction. This will certainly start to drive the turbine in reverse direction, which does not exert a high force on the friction elements, as long as the pump is released, whereafter, the pump is engaged and the torque converter is utilized to reverse the direction of the locomotive. The precise functioning of the gear box F/R is evident to those skilled in the art and will not, therefore, be described in detail.

Figure 3:
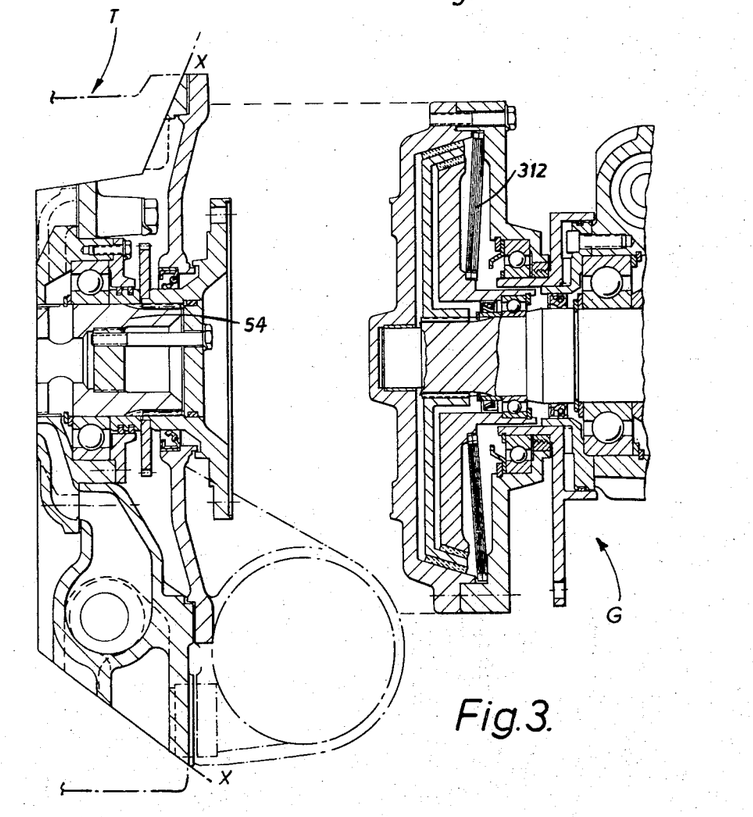
FIG. 3 shows schematically another form of the invention, namely a combination of the releasable pump torque converter and a synchromesh gear box.

FIG. 3 shows schematically another embodiment of the invention comprising a combination of the releasable pump torque converter T of FIG. 1 and a synchromesh gear box G. In order to simplify the drawings that part of the torque converter of FIG. 1 appearing to the left of line X—X has been omitted in FIG. 3. The turbine shaft 54 and synchromesh gear box G are interconnected by a holding clutch 312 which is essentially the same as clutch 12 of FIG. 1. The holding clutch connection 312 is releasable and connectable only when the pump part is released, which reduces the mass on the primary side of the synchromesh gear box to a minimum and thereby establishes a total release. This is necessary only for the releasable pump torque converter, whereas a releasable turbine torque converter will not need this clutch. However, this arrangement is valuable in that a releasable pump is a particularly elegant and simple arrangement which is eminently suitable for a high performance torque converter of the kind shown and in accordance with my co-pending U.S. Application Ser. No. 171,636, filed Aug. 13, 1971. It is, however, a more expensive arrangement than the one which will now be described in connection with FIG. 4.

Figure 4:
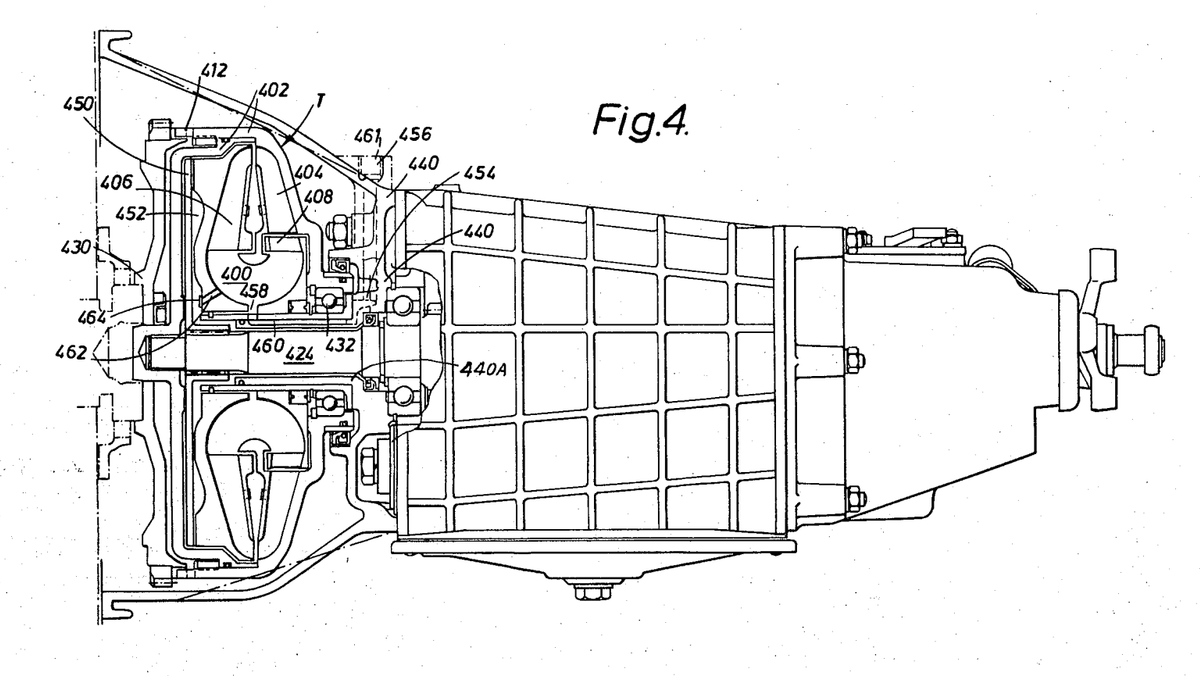
FIG. 4 shows a torque converter with a releasable turbine combined with a standard synchromesh gear.

FIG. 4 shows a torque converter T including a releasable turbine bladed component and mounted in combination with a standard synchromesh gear. This release facility permits total mechanical disconnection of the turbine bladed component from the turbine shaft. Further, this particular form of the invention produces a low drag torque which does not absorb any more than say 25 percent of the synchronizing torque even when effecting a two-step shift in the synchromesh gear box. Another aspect of this form of the invention is the omission of a release clutch normally fitted between the torque converter and the synchromesh gear box and is especially suitable for use with lighter vehicles since it possesses low stall torque multiplication.

The torque converter of FIG. 4 has a bladed pump component 404, a bladed turbine component 406 and a bladed guide vane component 408 mounted within a rotatable casing 402 defining a working chamber 400. The rotatable casing 402 is connected to a fly-wheel 430 of an internal combustion engine or other prime mover via a spline connection 412 and has a stationary abutment 440. The rotatable casing 402 is supported at one end thereof on the stationary abutment via a bearing 432 and at the other end thereof by the flywheel 430.

Within the rotatable casing 402, there is mounted a turbine shaft 424 which carries a friction disc 450. A space 452 is defined by the friction disc 450 and the turbine bladed component 406 and communication with this space is via a channel 454/456. On the other hand the working chamber 400 and the space to the left of the friction disc as viewed in FIG. 4 are connected to the outside of the torque converter via a channel 458/460 and bore 461 shown in dotted lines and disposed parallel to 456. The guide vane component 408 is journalled on a stationary shaft 440A which is an extention of the stationary abutment 440 and between these two elements there is a one way clutch which allows the guide vane component not only to rotate in the same direction as rotation of the pump 404 but also, under suitable conditions to change the direction of the fluid within the working chamber 400 so as to create torque multiplication within the torque converter.

A hole 462 is formed as shown in a bladed turbine component 406 and this hole is fitted with a one way maximum pressure valve consisting of a leaf spring 464. The turbine shaft 424 can be connected with the turbine bladed component 406 by allowing fluid, introduced through the hole 461, to pass the maximum pressure valve 464 and leave through the hole 456. On the other hand, the turbine can be released from the output shaft and, more or less connected to the bladed pump component 404 by reversing the direction of flow, that is, introducing fluid through the hole 456 and extracting the fluid through the hole 461. In this way, the fluid does not pass through the maximum pressure valve 464 but enters space 452 where it separates the friction disc 450 and the bladed turbine component and ultimately enters the working chamber.

The form of torque converter embodying the above described arrangement for releasing the driving connection to reduce torque absorption of the rotating casing is especially suitable for use in torque converters used in conjunction with standard synchromesh gear boxes because the torque necessary to drive the friction disc 450 in the fluid is reduced when compared with earlier transmissions. Further, cooling of the torque converter is achieved using the same fluid used for connection and disconnection of drive which, as will be appreciated is accomplished by differential fluid pressure.

Figure 5:
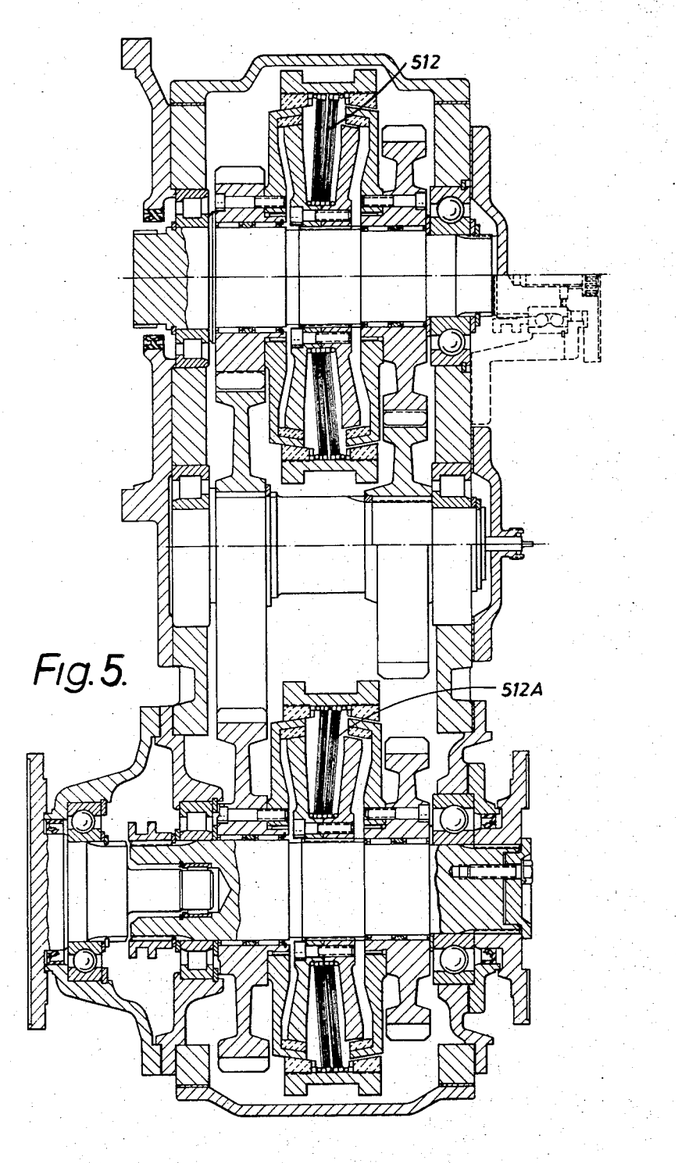
FIG. 5 shows a two-speed forward, two-speed reverse drop gear box suitable for combination with a torque converter arranged according to this invention.

FIG. 5 shows a two-speed forward, two-speed reverse, drop gear box suitable for combination with a torque converter having a release facility for one of the torque converter bladed components in the drive line, when the controls of the two holding clutches 512/512A in the drop gear are selectively interconnected with the release of the bladed component. In this way synchronisation under torque transportation is avoided.

Figure 6:
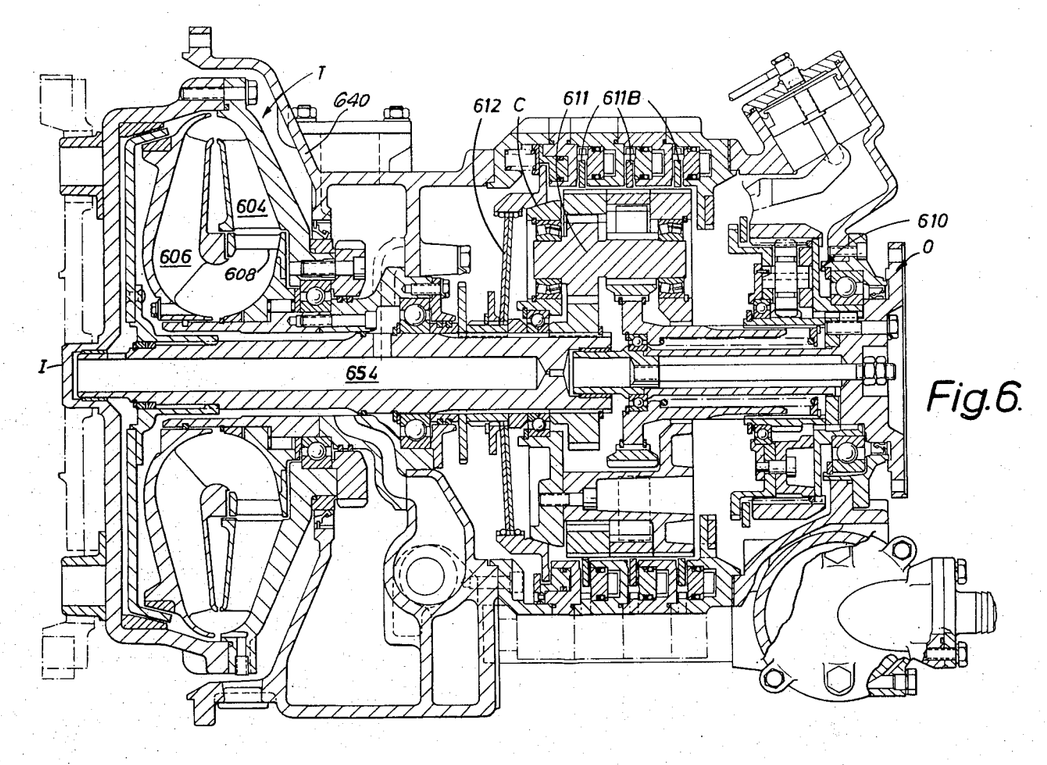
FIG. 6 shows a vehicle transmission with releasable bladed component and planet gears with holding brakes and clutches.

FIG. 6 shows a vehicle transmission including a torque converter T with releasable turbine bladed component 606, a bladed pump component 604 and a bladed reaction component 608. Combined with the torque converter is a multiple planet gear 611 with associated holding brakes and clutches 611B. Preceding the multiple speed planetary gear 611 in the drive line is a holding clutch 612, in order to avoid ventilation losses, the holding clutch is operable so that the whole planet gear 611 rotates via conical clutch surfaces C as one mass. Thus, the disc brakes 611B which are of the holding brake type are the main source of any drag torque when considered in relation to stationary abutment 640. The holding clutch 612 is of the overcentered spring type which may assume either of two positions and which does not require any contact between its operationally controlling servo-motors either when connected or when released. Further, the planet gear 611 is designed in such a way that, for high torque multiplication in the gear, more parts are rotating relatively to each other than for the low gear ratio, thus avoiding so called ventilation losses in the lower gear ranges in which the transmission is operable for long periods. Further, the reverse gear is designed to rotate as one unit with the output shaft O without any mechanical contact with the stationary part during all forward drive conditions thereby reducing the ventilation losses which is now possible with the present invention.

Figure 7:
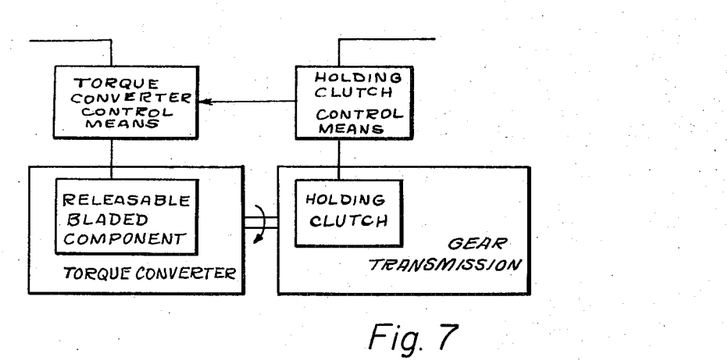
FIG. 7 is a schematic diagram showing a representation of a control box for the holding clutch and the torque converter.

In the various embodiments, it was indicated that the releasable bladed component of the torque converter would be released whenever the holding clutch or clutches were operated. The specific details for providing such regulation are apparent to one skilled in the art and will not be described in detail. However, such an arrangement is shown schematically in FIG. 7 which shows a control means for the holding clutch or clutches of a gear transmission from which a signal is transmitted to the torque converter control means which is associated with the releasable bladed component to release the same whenever the holding clutch is changed from one position to another.

What we claim is:

1. A vehicle transmission including the combination of a torque converter having a pump member, a reaction member and a turbine member, said pump member and said turbine member being drive members which are adapted to be drivingly engaged to a torque converter input drive shaft and a torque converter output drive shaft, respectively, at least one of said drive members being releasable from its said drive shaft, the said torque converter output drive shaft being drivingly engaged with a gear transmission, a clutch arranged to control the connection of the torque converter and the gear, said clutch being of the holding type which is capable of synchronizing the said turbine shaft and the gear at a force less than one-half of the force necessary to carry over torque from the torque converter shaft to the gear transmission without slippage.

2. A transmission according to claim 1 wherein the torque converter is of the rotating casing type and the said gear transmission includes a multiple speed gear having at least one said holding clutch arrangement which may take either of two positions, and including means for automatically releasing the releasable drive member when the holding clutch is changed from one position to the other.

3. A transmission according to claim 2, including a forward/reverse gear connected in the drive line between the torque converter output shaft and the multiple speed gear transmission.

4. A transmission according to claim 3, including a multiple speed synchromesh gear located after the torque converter.

5. A transmission according to claim 1 wherein the releasable drive member is the pump member of the torque converter.

6. A transmission according to claim 1 wherein the releasable drive member is the turbine member of the torque converter.

7. A transmission comprising a torque converter and a mechanical gear transmission having at least two independently connectable gear trains characterized in that the torque converter has a pump member, a reaction member and a turbine member, said pump member and said turbine member being drive members which are adapted to be drivingly engaged to a torque converter input drive shaft and a torque converter output drive shaft, respectively, at least one of said drive members being releasable from its said drive shaft, and said torque converter output drive shaft being operatively connectable to one of said gear trains and means for synchronizing the parts of that gear train for torque transmission only when the said releasable drive member is released.

8. A transmission according to claim 7, wherein the said releasable drive member is a part of a servo-motor operable to effect engagement or release thereof via a friction coupling and wherein one friction surface of the friction coupling is a part of the releasable drive member.

9. A transmission according to claim 7 wherein said synchronizing means includes a holding clutch arranged to control the connection of the torque converter and the gear, said clutch being of the holding type which is capable of synchronizing the said turbine shaft and the gear at a force less than one-half of the force necessary to carry over torque from the torque converter shaft to the gear transmission without slippage.

10. A transmission according to claim 9 wherein the pump member is the releasable member and is releasable from the said input drive shaft and wherein the turbine output shaft of the torque converter is disconnectable from the gear train by said holding clutch only when the pump member is released from the casing.

11. A transmission according to claim 10 including a synchromesh gear box.

12. A transmission according to claim 7 including a synchromesh gear box and in which the turbine member is releasable from the turbine output shaft and the turbine member is a part of the servo-motor operable to effect engagement or release of the turbine member from the turbine output shaft via a friction coupling of which the turbine member is a part.

13. A transmission according to claim 9 including a spring means for connecting the holding clutch.

14. A transmission according to claim 13, in which the spring means is of the overcentered type.

15. A transmission according to claim 7, wherein one of said gear trains is a forward/reverse gear connectable or disconnectable into or out of forward or reverse gear by an overcentered spring loaded holding clutch only when the releasable member is released.

16. A transmission according to claim 7 wherein said gear trains include at least one two-speed gear, wherein the gears thereof are connectable by an overcentered spring loaded holding clutch only when the releasable member is released.

17. A transmission according to claim 9, wherein the holding clutch comprises two generally conical spring washers in which, in a clutch released condition, the cones thereof in juxtaposition, are mounted relative to each other so that their respective axial force characteristics are such that one washer imposes a maximum force when the other imposes substantially zero or minimum force to effect connection or release when the conicity is reversed.

18. A transmission according to claim 7 wherein one of said gear trains includes a coaxial reverse gear having a spring load dog clutch connection between its output and input shafts and a dog clutch connection for connecting the reverse gear train against the force of the spring connecting the first clutch.

19. A transmission according to claim 7 wherein said gear trains include a plurality of planet gear trains for forward drive selectively connectable for each gear ratio by maintaining one gear ring stationary by means of a holding brake.

20. A transmission according to claim 19 including a locking device for effecting direct drive through the planet gear trains, the blocking device comprising an overcentered spring loaded holding clutch operated by a servo-motor having sliding contact with the overcentered element during a shift.

21. A transmission according to claim 7 wherein during a change of gear ratios, the releasable drive member in the torque converter is automatically released.

22. A transmission according to claim 13, wherein the pressure applied to the holding clutch surfaces is within the range 10 – 40 Kg/cm² during the synchronizing portion of the clutch engagement and between 100 – 200 Kg/cm² during the torque carry over portion of the clutch engagement.

23. A transmission according to claim 1, wherein said holding clutch is a friction clutch.

24. A transmission according to claim 23, wherein said friction clutch comprises a single set of opposed friction surfaces.

25. A transmission according to claim 2, said multiple speed gear transmission being a two-speed forward gear transmission.

26. A transmission according to claim 2, said multiple speed gear transmission being a forward/reverse gear transmission, and including a holding clutch arrangement for each of said forward and reverse gears.

27. A transmission according to claim 26, said gear transmission having two forward speeds and two reverse speeds.

28. A transmission according to claim 1, including a spring means for engaging the holding clutch.

29. A transmission according to claim 1, wherein during a change of gear ratios, the releasable drive member in the torque converter is automatically released.

30. A transmission according to claim 9, wherein one of said gear transmissions includes said holding clutch and the other includes a dog clutch which is connectable in parallel with the said holding clutch.

31. A vehicle transmission including the combination of a torque converter having a pump member, a reaction member and a turbine member, said pump member and said turbine member being drive members which are adapted to be drivingly engaged to a torque converter input drive shaft and a torque converter output drive shaft, respectively, at least one of said drive members being releasable from its said drive shaft, the said torque converter output drive shaft being drivingly engaged with at least two clutches, and including an overcentered spring means for engaging said clutches.

* * * * *